M. M. LAHUE.
MILK PAIL.
APPLICATION FILED MAR. 24, 1906.
No. 905,716.
Patented Dec. 1, 1908.
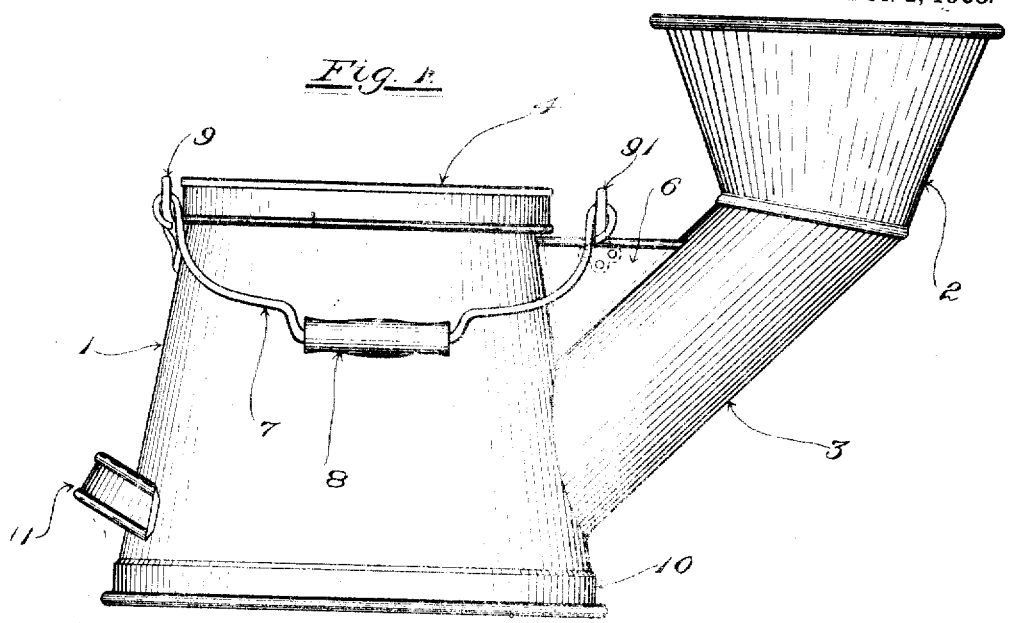
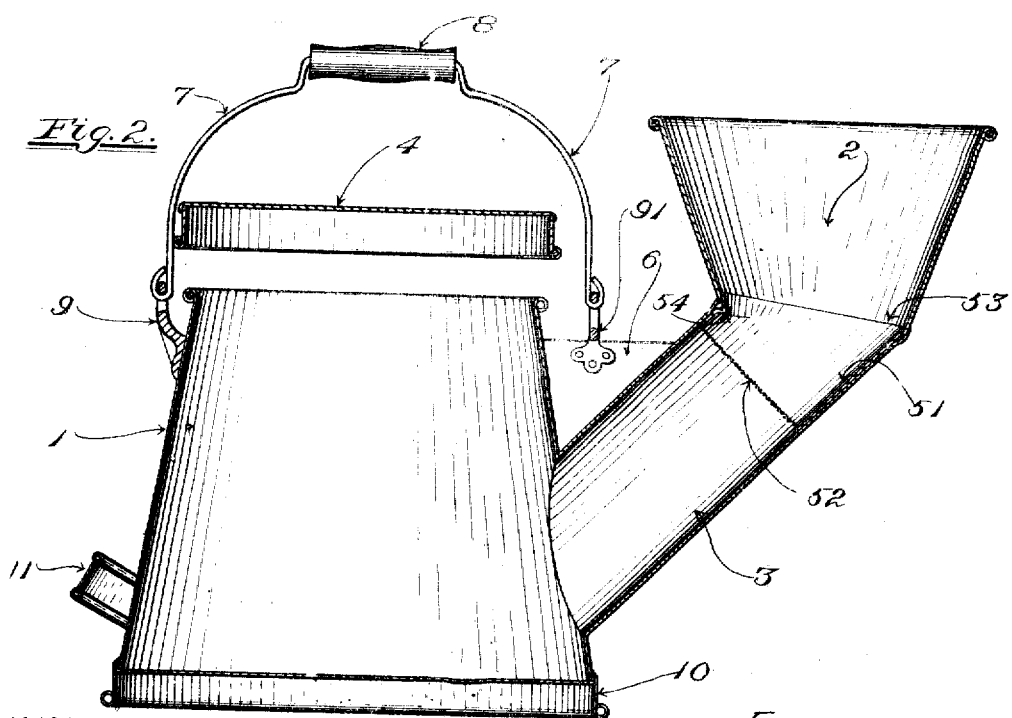
Witnesses:
Oscar F. Hill
Edith J. Anderson.
Inventor:
Moses M. Lahue
by Chas. F. Randall
Attorney.

UNITED STATES PATENT OFFICE.

MOSES M. LAHUE, OF LOWELL, MASSACHUSETTS.

MILK-PAIL.

No. 905,716.  Specification of Letters Patent.  Patented Dec. 1, 1908.

Application filed March 24, 1906. Serial No. 307,792.

*To all whom it may concern:*

Be it known that I, MOSES M. LAHUE, a citizen of the United States, residing at Lowell, in the county of Middlesex, State of Massachusetts, have invented a certain new and useful Improvement in Milk-Pails, of which the following is a specification, reference being had therein to the accompanying drawings.

My invention consists in a pail for use in milking, designed to receive and contain the milk under more cleanly and better sanitary conditions than in the case of the milk-pails heretofore in use; also adapted to be so placed during the milking as to lessen the liability of the pail being stepped upon or kicked by a restless cow, and further adapted to serve as a seat for the person doing the milking.

An embodiment of the invention is shown in the drawings, in which latter,—

Figure 1 shows the said embodiment in side elevation. Fig. 2 shows the same in vertical cross-section with the cover uplifted.

My improved milk-pail comprises, essentially, a body-portion 1 and a receiver 2, the said receiver being open-topped to receive milk directed into the same during the milking operation, and being in communication with the interior of the body-portion through a conducting-portion 3 so that milk entering the said receiver flows thence into the said body-portion. The body-portion 1 is furnished with a cover 4, the cylindrical flange of which fits down around the outside of the top of the said body-portion. During the use of the pail in milking the said cover remains in place, constituting a closure for the top of the body-portion. The shell of receiver 2 is made with an outward flare to facilitate entrance of milk. Within the upper portion of the conducting-portion is located a strainer comprising a cylindrical shell 51, fitting within the shell of the said conducting portion, and a wire cloth or other suitable diaphragm 52. The said strainer is furnished with a flaring or outturned flange 53 which engages within the inner portion of the flare of the receiver to insure the proper position of the strainer. A brace 6 extends from the body-portion 1 to the conducting-portion 3, bridging the space between them and giving additional support to the said conducting-portion, the said brace serving also as a means of affording connection for one end of the bail 7. The bail is furnished with the usual handle 8, and is hinged to the two ears 9, 91, one of which is riveted to the body-portion and the other to the brace. By fastening the ear 91 to the brace 6 at an intermediate point between the body-portion and conducting-portion, as shown in the drawings, a proper balancing of the pail is insured when the pail contains milk. The body-portion is formed or provided with a downwardly extending cylindrical flange 10, which is designed to hold the bottom of the body-portion from resting directly upon the surface upon which the pail rests when in use, and also to afford a steadier support when the pail is placed upon uneven ground or flooring.

The cover 4 constitutes a closed top for the pail, forming a seat for the milker. When he is seated upon the same, the receiver 2 projects forwardly between his knees, into position beneath the cow being milked. None of the usual matters can drop into the body-portion of the pail, and those entering the receiver 2 are caught by the screen 52 of the strainer. The body-portion of the pail, in consequence of being located at one side of the cow is out of the way of her feet, while the conducting portion and receiver are protected by the knees of the milker. The bottom flange 10 is stoutly made in order that it may safely withstand the effect of the weight of the milker when he is seated upon the pail.

At 11 is a handle upon the rear of the body-portion, for convenience in tilting the pail when the contents of the pail are to be poured out. Before pouring the same, the strainer is withdrawn from its seat in connection with the receiver as shown in Fig. 2, and, being in a clean condition, is inserted in a reversed position into the opening from the body-portion into the inner end of the conducting portion. To facilitate the extraction of the strainer it is furnished with a finger-hold, as 54, Fig. 2, of convenient character.

The described milk-pail is adapted to be employed as a coffee-pot when coffee is required to be made on a large scale. When thus employed, the strainer is seated in the opening from the body-portion into the conducting-portion. By grasping the conducting portion and receiver between his knees, the milker is enabled, without the use of his hands, to shift the pail about more or less to follow the movements of a restless cow.

I claim as my invention:—

1. The covered milk-pail having the lateral extension with open-topped receiver, and provided with the removable strainer adapted to be inserted into each end of the said extension at the option of the user.

2. The covered milk-pail having the lateral extension with open-topped receiver, the brace connecting the said extension with the body-portion of the pail, and the bail hinged at one end thereof to the body of the pail and at the other to the said brace forward of the said body.

In testimony whereof I affix my signature in presence of two witnesses.

MOSES M. LAHUE.

Witnesses:
CHAS. F. RANDALL,
EDITH J. ANDERSON.